Nov. 29, 1960  J. F. DOBRY ET AL  2,962,381
SEGMENT WHEEL FEEDER
Filed July 2, 1957  3 Sheets-Sheet 1

INVENTORS.
WALTER E. BENEDICT
JOSEPH F. DOBRY
BY
ATTORNEY

Nov. 29, 1960   J. F. DOBRY ET AL   2,962,381
SEGMENT WHEEL FEEDER

Filed July 2, 1957   3 Sheets-Sheet 2

INVENTORS.
WALTER E. BENEDICT
JOSEPH F. DOBRY
ATTORNEY

Nov. 29, 1960 J. F. DOBRY ET AL 2,962,381
SEGMENT WHEEL FEEDER
Filed July 2, 1957 3 Sheets-Sheet 3

INVENTORS.
WALTER E. BENEDICT
JOSEPH F. DOBRY

United States Patent Office 2,962,381
Patented Nov. 29, 1960

2,962,381

SEGMENT WHEEL FEEDER

Joseph F. Dobry, Langhorne, and Walter E. Benedict, Newtown, Pa., assignors to Congoleum-Nairn Inc., Kearny, N.J., a corporation of New York Filed July 2, 1957, Ser. No. 669,655

3 Claims. (Cl. 117—16)

This invention relates to flake distribution and in particular to a method of and apparatus for distributing flaky material on a moving web to produce decorative effects in smooth surface coverings for floors, walls and the like.

In the manufacture of smooth surface coverings, it is common practice to create unusual decorative effects by depositing thin flakes of plastic composition upon a surface and thereafter consolidating the flakes into a smooth uniform sheet by heat and pressure, as for example, in a flat bed press or between calender rolls. The flaky composition can be deposited to completely cover a surface to create a product with a terrazzo-like decoration, or the flaky composition can be sprinkled thinly over the surface of a preformed sheet of similar composition and thereafter pressed into the sheet to produce a product having a plurality of splashes or flakes of color.

Resinous compositions containing a thermoplastic resin such as polyvinyl chloride, vinyl chloride-vinyl acetate copolymers and the like are widely used in the manufacture of smooth surface floor coverings. Such compositions are relatively hard at room temperatures but soft and workable at elevated temperatures. In the production of decorative effects as described above, a resinous composition is commonly sheeted and then the sheet is broken or cut into a plurality of flakes which can range from fine dust to flakes as large as one square inch in surface area and a thickness as small as 0.010 inch. It is apparent in the creation of decorative effects that the rate of feed of flakes onto the base sheet must be controlled within close limits so that a product with uniform decoration and gauge can be produced.

Efforts to utilize conventional feeding apparatus for such purposes have not met with great success. The flakes of composition become curled, twisted and partially deformed during processing and tend to interlock and bulge when a mass of different sizes are placed together, thus jamming in conventional feeders. Feeders which utilize the doctor blade principle for filling compartments with a controlled amount of material have proved completely unsatisfactory for this type of material. The thin flakes tend to bulge beneath the doctor blade with the result that a non-uniform feed of material occurs. This effect is particularly detrimental when only a thin feed of particles is required. Slight irregularities in feed rate cause changes in product decoration with resulting low yield of perfect goods.

A general object of this invention is to improve the methods of and apparatus for depositing such flaky material onto a surface in such manner as to obviate the above mentioned difficulties.

Another object is to produce a controllable, uniform coating of flaky decorative material on a moving web.

A related object is to control the rate of feed of the flaky material so as to produce a more uniform coating and thus to prevent variations in the decorative effect produced.

In accordance with the invention, thin flakes of material are deposited on a moving web at a uniform rate by maintaining a supply of flakes in contact with a revolving cylindrical surface having horizontal slots along its surface during its upward movement so that a portion of the flakes are picked up by and fill each slot. The upward motion of the cylindrical surface is continued so that at least one-fourth of the total upward movement of each slot takes place after and out of contact with the supply of flakes. During this upward movement some of the flakes, due to the action of gravity, fall out of the slots and back into the supply of flakes. The amount of flakes retained in each slot is usually reduced to less than one-half of the flakes which filled the slot originally. The retained flakes are carried by each slot until they are caused to fall out of the slot by the action of gravity as the cylindrical surface revolves, onto the moving web. A flake distributing means can be placed in the path of fall of the flakes to cause the flakes to be distributed over a wider area.

The invention will be described with reference to the drawings in which.

Figure 1:
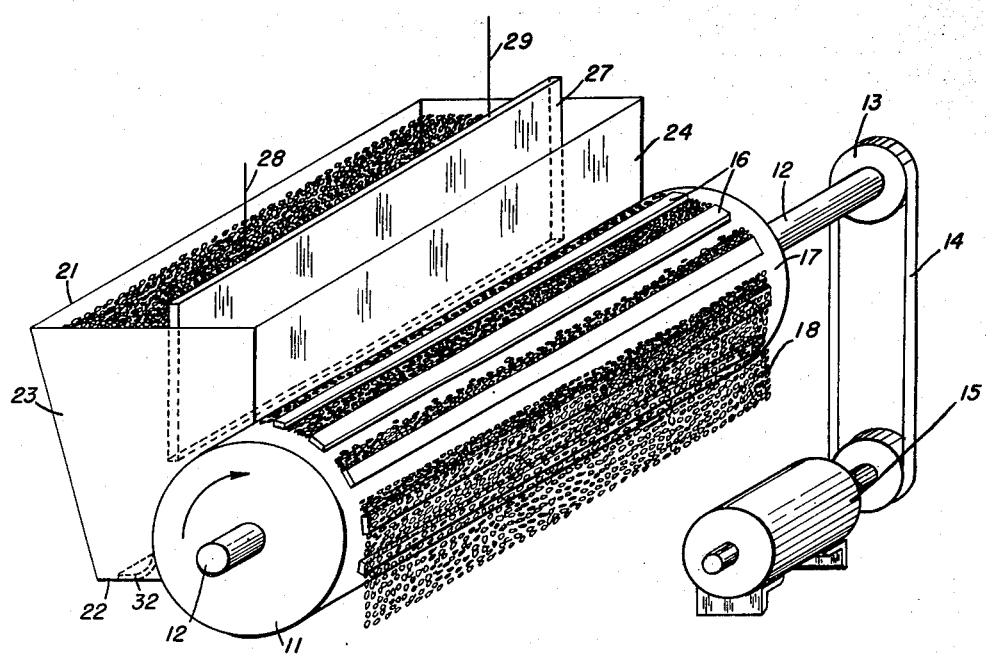
Fig. 1 is a prospective drawing showing apparatus for feeding flakes in accordance with the invention.
Figure 2:
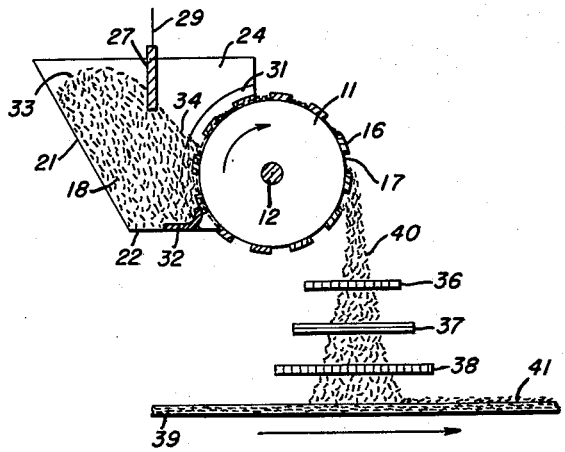
Fig. 2 is a side elevation view in section of the apparatus shown in Fig. 1 and illustrates one form of flake distribution means.

Referring to Figs. 1 and 2, a cylindrical drum 11 provided with a central shaft 12 is rotated by means of a motor 15 through a belt 14 and associated pulley 13 affixed to the shaft 12. The surface of the drum is provided with a plurality of radial projections 16 which delineate spaces or slots 17 upon the surface of the drum capable of holding flakes 18. The projections 16 are in the form of cleats applied to the surface of the drum. A flake supply hopper 21 communicates with a portion of the circumference of the drum over the length presented by the projections. The hopper is provided with a bottom plate 22 and end plates 23, 24 which are curved to fit tightly against the circumference of the drum at the ends of the projections 16. The hopper is filled with flakes 18. A baffle plate 27 which can be moved vertically by means of rods 28, 29 extends the full length of the hopper. The inside surfaces of the two end members 23, 24 can be provided with strips of sealing material such as indicated at 31 in Fig. 3 so that the hopper makes a tight seal with the circumference of the drum and with the ends of projections 16. Flap 32 of resilient material extends the full length of the bottom of the hopper and is attached to the bottom plate 22. This resilient material seals the bottom of the hopper where it contacts the drum and prevents loss of material. The baffle 27 is used to maintain a uniform flake level 34 within the hopper in contact with the surface of the drum. Flakes are maintained on the opposite side of the baffle at a level 33 which is above the bottom edge of the baffle 27. Flakes are picked up and carried by the slots 17 on drums 11 and then fall from the slots 17 in a stream 40 onto a moving web of backing material 39 through flake distributing means 36, 37 and 38. The flakes 41 on the web 39 are conveyed to a consolidating apparatus (not shown) for pressing the flakes into a smooth sheet.

Figure 7:
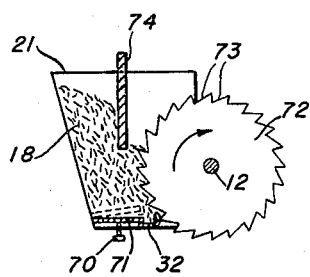
Fig. 7 is a side elevation view showing a modification of the feeding drum of Fig. 1 and means for supplying flakes.
Figure 4:
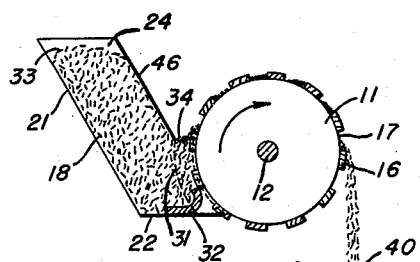
Fig. 4 is a side elevation view in section showing a modification of the feeding drum of Figs. 1 and 2.
Figure 4:
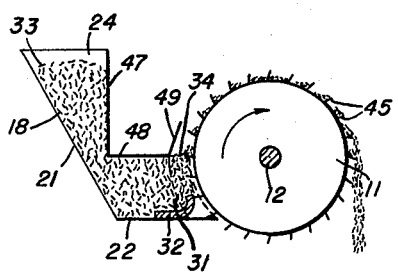
Figure 3:
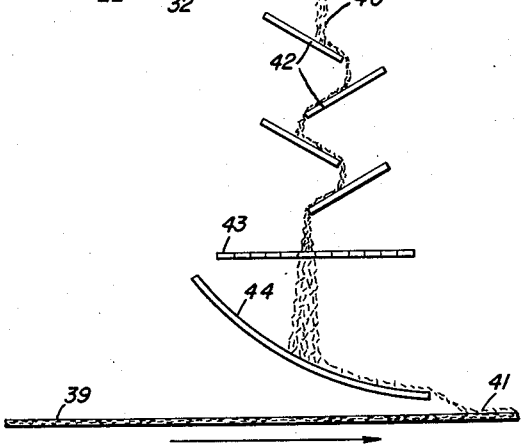
Fig. 3 is a side elevation view in section of the feeding apparatus shown in Fig. 1 showing a second modification of the means for supplying flakes and flake distributing means.
Figure 5:
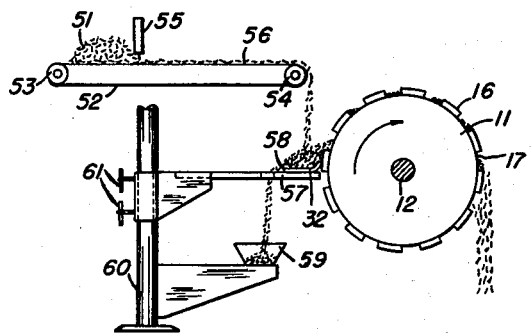
Fig. 5 is a side elevation view in section showing the feed wheel of Figs. 1 and 2 with a modification of the means for supplying flakes.
Figure 6:
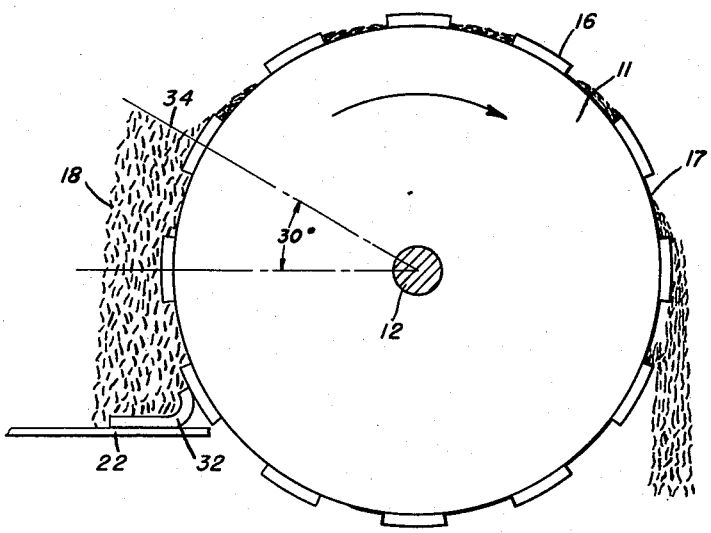
Fig. 6 is an enlarged side elevation in section showing the feed drum of Fig. 1.

The flake supply means can be a hopper 21 having various forms as indicated in Figs. 1, 2, 3, 4 and 7 or can be a supply means such as indicated in Fig. 5. The hopper 21 shown in Figs. 1 and 2 uses a baffle plate 27 to regulate the height of flakes 18 which can press against the feed drum 11. The hoppers 21 shown in Figs. 3 and 4 are so constructed that their front walls 46 and 47 respectively serve as the baffles for maintaining the supply of flakes at the desired level. As shown in Fig. 4 the flakes 18 are fed to the revolving drum through a confined chamber formed by horizontal plate 48 and the bottom plate 22 of the hopper. A baffle 49 is provided to guide any flakes falling from the slots back onto the supply of flakes adjacent the drum. As shown in Fig. 7 the bottom 71 of the hopper 21 is hinged at one end and can be moved through a small arc by means of solenoid 70. The periodic moving of the bottom 71 will prevent the flakes from jamming under the baffle 74.

The arrangement for supplying flakes in Fig. 5 is based on an overflow principle. A platform 57 is provided for holding the flakes 58 in contact with the feed drum 11. The platform is so constructed that it will only hold sufficient flakes to provide the proper depth of flakes to press against the feed drum 11. A resilient material 32 is provided which seals the end of the platform 57 where it contacts the feed drum 11 and prevents loss of flakes. The flakes are fed to the platform from a flake supply 51 which is maintained on a continuous belt 52. A baffle 55 is provided for limiting the depth of material 56 carried by the belt 52. The material which passes under the baffle is carried by the belt and dropped onto the platform. The rate of speed of the belt is controlled so that it supplies flakes to the platform at approximately the same rate as they are picked up by the slots 17 on the feed wheel. The overflow of flakes from the platform 57 is caught in a hopper 59 and can be returned to the flake supply 51. The height of the platform can be adjusted by moving on upright column 60 and securing with set screws 61.

It is essential to the invention that the height of the flakes pressing against the feed drum be maintained within defined limits. The height of the flakes should be maintained between the horizontal and a plane extending through the central axis of the drum at an angle of 45° with the horizontal. The depth of the flakes should be at least one and one-half times the vertical height of a slot. The depth of the flakes will depend in large part on the size of the flakes. With smaller flakes the depth can be substantially smaller than that required with larger flakes. It has been found that the best results are obtained when the height of the flakes is maintained between 10 and 30° above the horizontal.

The slots 17 on the drum can be formed by cleats as indicated above or can be thin, radically disposed, slightly curved projections 45 as shown in Fig. 4. The slots can be substantially rectangular in cross section or they can be triangular slots 73 as shown in Fig. 7.

Flake distributing means of various forms can be provided beneath the hopper to effect more uniform distribution of flakes. Grids 36, 37 and 38 as shown in Fig. 2 can be used comprising a plurality of spaced wires or rods which extend either transversely with respect to the central axis of the drum or parallel thereto. Alternately, the distributing means can be in the form of screens. Also, baffle plates 42 extending parallel to the central axis of the drum can be disposed at various angles with the horizontal to catch and distribute the streams of flakes falling from the drum. It is sometimes desirable in order to prevent any bounce of flakes from the web to interpose means between the hopper and the web to translate the vertical motion of the granules into a horizontal motion by means such as a concave plate 44 shown in Fig. 3. This is particularly desirable when a very thin sprinkling of flakes is made upon a preformed sheet of resinous composition. Grids 43 can be used in combination with the baffle 42.

In operation, the drum 11 is rotated at a constant rate by means of power applied to the shaft 12. The baffle plate 27 is adjusted so that the level of flakes 34 in contact with the moving surface of the drum is at a point between 0 degrees and 45 degrees above the plane of the central axis of the drum. Flakes are maintained in back of the baffle plate in sufficient supply to prevent the flakes from falling below the bottom edge of the baffle. It is essential to the operation of this device for the level of flakes to be maintained at a fixed point throughout its operation. As the drum 11 rotates, flakes are picked up by the slots 17 delineated in the surface of the drum by the cleats 16 or other forms of radial projections. Due to the slipper nature of the flakes and the step angle at the point where they are first picked up, excess flakes fall out of the slots back into the hopper so that the pockets tend to be less than half full. By rotation of the drum, the flakes are carried out of the hopper in the pockets and fall out of the slots by gravity off the opposite side of the drum onto flake distributing means and from there to the web of backing material. The turbulence caused by the rotating drum within the mass of flakes serves to prevent any undesirable bridging and non-uniform level conditions within the hopper.

It has been found that the feed rate of flakes is a direct function of the rate of rotation of the drum, the depth and width of the spaces delineated on the surface of the drum and the level of flakes maintained within the hopper which contact the portion of the circumference of the drum. The higher the level of flakes the greater is the feed rate. It has been found that when the level is maintained between 0 degrees and 45 degrees above the plane of the central axis of the drum, satisfactory control of the feed rate can be effected. A level between 10 degrees and 30 degrees above the plane of the central axis of the drum is particularly effective. Within this range of flake levels the pockets are between about 25 percent and 50 percent full of flakes. It is preferred that shallow spaces be used on the surface of the drum in conjunction with a high rate of rotation to insure the maximum uniformity of flake feed rate.

For purposes of illustration a typical construction of apparatus for uniformly covering 15 percent of a web with flakes one-quarter inch square and 0.015 inch thick a feeding apparatus having a drum with sixteen inch diameter can be used. The drum is supplied with twenty-eight slots eleven-sixteenth inch wide and one-sixteenth inch deep by securing cleats one and one-sixteenth inches wide to the drum. The drum is rotated at a speed of 6 revolutions per minute while the web travels at the rate of 25 feet per minute. The flakes are maintained at a level 30° above the horizontal and to a depth of 20° below the horizontal. Three screens are interposed between the web and feed drum in the path of fall of the flakes having mesh openings of approximately one-half inch.

The elements of the apparatus and the manner of using the same can be varied considerably without departing from the scope of the invention. For example, the apparatus shown in Fig. 1 has projections which extend in length along only a portion of the length of the drum. It is possible for the projections to extend the full length of the drum, in which case the end members of the hopper will ride around the two end surfaces of the drum. Alternately, the slots on the drum surface can be formed by cutting radially disposed depressions extending in length along the surface of the drum, instead of applying raised projections to the drum surface. Whatever configuration is employed, it is necessary only that sealing means be provided to prevent flakes from escaping from the hopper. It should therefore be understood that the embodiments described herein and shown in the figures of the drawings are merely illustrative of the invention and are not intended to limit the scope thereof.

Any departure from the above description which conforms to the present invention is intended to be included within the scope of the claims.

What is claimed is:

1. A method of uniformly depositing thin flakes of material upon a moving web in a controllable manner, which comprises maintaining a supply of said flakes in contact with an upwardly moving cylindrical surface having horizontal slots along its surface so that a portion of said flakes are picked up and fill said slots, continuing the upward motion of the cylindrical surface for between one-fourth and one-half its total upward movement while the filled slots are out of contact with said supply of flakes thereby limiting the amount of flakes retained by said slots to the flakes resting on their smallest edge which is less than one-half of the flakes originally picked up, and rotating the surface in a downward direction, thereby allowing the flakes to fall from the slots onto the moving web during at least one-fourth of the downward distance traveled by each slot.

2. A method for uniformly depositing flakes having a thickness substantially less than their length and width upon a web in a controllable manner, which comprises maintaining a supply of said flakes in contact with a portion of the surface of a drum rotating about its horizontally disposed axis and having equally spaced, identical slots on its surface extending parallel with its axis so that a portion of the flakes from said flake supply are picked up and fill each slot as the slot moves upward in contact with said flake supply, continuing the upward movement of each filled slot for between one-quarter and one-half of its total upward movement while the slot is out of contact with said flake supply thereby limiting the amount of said flakes retained by the slot to the flakes standing on their smallest dimension which is less than one-half of the flakes originally picked up and continuing the rotation of said drum thereby allowing the flakes to fall from each successive slot onto the web during at least one-quarter of the downward distance traveled by the slot.

3. A method for uniformly depositing flakes having a thickness substantially less than their length and width upon a moving web in a controllable manner, which comprises maintaining a supply of said flakes in contact with a portion of the surface of a drum rotating about its horizontally disposed axis and having equally spaced, uniform slots along its surface parallel with its axis so that a portion of the flakes from said flake supply are picked up and fill each slot as the slot moves upward in contact with said flake supply, each of said slots having a vertical height greater than the largest dimension of each flake and a depth greater than the thickness and substantially less than the length and width of each flake and said flake supply having a depth of flakes of at least one and one-half times the vertical height of each slot, continuing the upward movement of each filled slot for between one-quarter and one-half its total upward movement while the slot is out of contact with said flake supply thereby limiting the amount of flakes retained by each slot to the flakes resting on their smallest dimension in the slot and continuing the rotation of said drum thereby allowing the retained flakes to fall from the slots onto the moving web during at least one-quarter of the total downward distance traveled by the slot.

References Cited in the file of this patent

UNITED STATES PATENTS

| | | |
|---|---|---|
| 269,850 | Hadden | Jan. 2, 1883 |
| 517,055 | Moorhouse | Mar. 27, 1894 |
| 1,606,721 | Rihl | Nov. 9, 1926 |
| 1,857,463 | Maclean | May 10, 1932 |
| 2,068,761 | Penley | Jan. 26, 1937 |
| 2,738,713 | Buczkowski | Mar. 20, 1956 |